(12) United States Patent
Feng

(10) Patent No.: US 10,798,709 B2
(45) Date of Patent: Oct. 6, 2020

(54) COMMUNICATIONS METHOD, TERMINAL DEVICE, AND NETWORK DEVICE

(71) Applicant: GUANGDONG OPPO MOBILE TELECOMMUNICATIONS CORP., LTD., Dongguan, Guangdong (CN)

(72) Inventor: Bin Feng, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 241 days.

(21) Appl. No.: 15/779,770

(22) PCT Filed: Mar. 18, 2016

(86) PCT No.: PCT/CN2016/076804
§ 371 (c)(1),
(2) Date: May 29, 2018

(87) PCT Pub. No.: WO2017/156787
PCT Pub. Date: Sep. 21, 2017

(65) Prior Publication Data
US 2020/0015217 A1    Jan. 9, 2020

(51) Int. Cl.
*H04W 72/04* (2009.01)
*H04B 7/26* (2006.01)

(52) U.S. Cl.
CPC ........ *H04W 72/048* (2013.01); *H04B 7/2656* (2013.01); *H04W 72/042* (2013.01); *H04W 72/0446* (2013.01); *H04W 72/0453* (2013.01)

(58) Field of Classification Search
CPC .................. H04W 72/00; H04B 7/00
See application file for complete search history.

(56) References Cited

U.S. PATENT DOCUMENTS

2011/0230219 A1* 9/2011 Shores .............. H04L 5/0062
455/507
2013/0242822 A1* 9/2013 Yang ................. H04L 1/1861
370/280

(Continued)

FOREIGN PATENT DOCUMENTS

CN    101262279 A    9/2008
CN    104468030 A    3/2015

(Continued)

OTHER PUBLICATIONS

International Search Report in international application No. PCT/CN2016/076804, dated Dec. 14, 2016.

(Continued)

*Primary Examiner* — Andrew Lai
*Assistant Examiner* — Sumitra Ganguly
(74) *Attorney, Agent, or Firm* — Ladas & Parry, LLP

(57) ABSTRACT

Provided in the embodiments of the present invention are a communications method, a terminal device, and a network device. The method comprises: a terminal device determining a first frequency-domain resource, said first frequency-domain resource being a usable resource preconfigured to support the use of a first TTI to transmit a first physical channel in a first target time unit, and the length of time of the first TTI being equal to the length of time of the first target time unit; a terminal device determining a second frequency-domain resource, said second frequency-domain resource being determined to be used for using a second TTI to transmit a second physical channel in a second target time unit, the second TTI being not smaller than the first TTI and the second target time unit at least partially overlapping with the first target time unit; a terminal device determining a third frequency-domain resource, the third frequency-domain resource containing at least part of the frequency-domain resource of the second frequency-domain resource, (Continued)

and said third frequency-domain resource being a maximum usable frequency-domain resource supporting the use of a first TTI to transmit a first physical channel in a first target time unit. The embodiments of the present disclosure increase resource utilization.

14 Claims, 11 Drawing Sheets

(56) References Cited

U.S. PATENT DOCUMENTS

| | | | |
|---|---|---|---|
| 2015/0331709 | A1 | 11/2015 | Agrawal et al. |
| 2015/0334685 | A1 | 11/2015 | Ji et al. |
| 2015/0334709 | A1 | 11/2015 | Ji et al. |
| 2015/0334729 | A1 | 11/2015 | Ji et al. |
| 2017/0164363 | A1 | 6/2017 | Zhang et al. |
| 2017/0318564 | A1* | 11/2017 | Lee .................. H04L 5/001 |
| 2018/0041325 | A1 | 2/2018 | Lee et al. |
| 2018/0219666 | A1 | 8/2018 | Lee et al. |

FOREIGN PATENT DOCUMENTS

| | | |
|---|---|---|
| CN | 105228248 A | 1/2016 |
| WO | 2015179136 A1 | 11/2015 |
| WO | 2016029736 A1 | 3/2016 |
| WO | 2016064049 A1 | 4/2016 |

OTHER PUBLICATIONS

Written Opinion of the International Search Authority in international application No. PCT/CN2016/076804, dated Dec. 14, 2016.
OPPO. "Overview of TTI Shortening" 3GPP TSG RAN WGI Meeting #84 R1-160596, vol./, No./, Feb. 19, 2016 (Feb. 19, 2016).
"Study on Latency reduction for LTE" 3GPP TSG RAN WGI Meeting #71 RP-160206, vol./, No./, Mar. 10, 2016 (Mar. 10, 2016).
Supplementary European Search Report in European application No. 16893952.8, dated Apr. 23, 2019.
Huawei et al: "Control signaling enhancements for short TTI", 3GPP Draft; R1-156461, 3rd Generation Partnership Project (3GPP), Mobile Competence Centre; 650, Route Des Lucioles; F-06921 Sophia-Antipolis Cedex; France, vol. RAN WG1, No. Anaheim, USA; 20151115-20151122 Nov. 15, 2015 (Nov. 15, 2015), XP051002921
Nokia Networks et al: "Considerations on required downlink physical layer enhancements for shorter TTI", 3GPP Draft; R1-160786, 3rd Generation Partnership Project (3GPP), Mobile Competence Centre; 650, Route Des Lucioles; F-06921 Sophia-Antipolis Cedex; France, vol. RAN WG1, No. St. Julian's, Matta; 20160215-20160219 Feb. 14, 2016 (Feb. 14, 2016), XP051054113.
LG Electronics: "Study on TTI shortening for downlink transmissions", 3GPP Draft; R1-160649, 3rd Generation Partnership Project (3GPP), Mobile Competence Centre; 650, Route Des Lucioles; F-06921 Sophia-Antipolis Cedex; France, vol. RAN WG1, No. St. Julian's, Matta; 20160215-20160219 Feb. 14, 2016 (Feb. 14, 2016), XP051053978.
English translation of the Written Opinion of the International Search Authority in the international application No. PCT/CN2016/076804, dated Dec. 14, 2016.
First Office Action of the Japanese application No. 2018-530067, dated Oct. 25, 2019.
Intel Corporation, On multiplexing of PDSCH with different TTIs and related enhancements[online], 3GPP TSG-RAN WG1#84 R1-160862, Internet <URL:http://www.3gpp.org/ftp/tsg_ran/WG1_RL1/TSGR1_84/Docs/R1-160862. zip>, Feb. 19, 2016.
OPPO, Discussion on TTI shortening[online], 3GPP TSG-RAN WG1#84b R1-162339, and Internet<URL:http://www.3gpp.org/ftp/tsg_ran/WG1_RL1/TSGR1_84b/Docs/R1-162339. zip>, Apr. 15, 2016.

* cited by examiner

COMMUNICATIONS METHOD, TERMINAL DEVICE, AND NETWORK DEVICE

RELATED APPLICATION

This application is an application under 35 U.S.C. 371 of International Application No. PCT/CN2016/076804 filed on Mar. 18, 2016, the entire contents of which are incorporated herein by reference.

TECHNICAL FIELD

The disclosure relates to the field of communications, and more particularly to a communication method, a terminal device and a network device.

BACKGROUND

A communication delay is mainly related to a length of a Transmission Time Interval (TTI), so that one of key technologies for reducing the transmission delay is to shorten the TTI. At present, it has been determined to start researching use of a shorter TTI for data transmission. However, compatibility with an existing Long Term Evolution (LTE) system is required to be ensured on a carrier supporting short-TTI transmission, that is, compatibility with an existing longer TTI is required. How to reasonably utilize resources in a system is a problem required to be considered.

SUMMARY

Embodiments of the disclosure provide a communication method, a terminal device and a network device, which may increase the resource utilization.

A first aspect provides a communication method, which may include that: a terminal device determines a first frequency-domain resource, wherein the first frequency-domain resource may be an available resource which is preconfigured for supporting transmission of a first physical channel in a first target time unit by using a first TTI, and a time length of the first TTI may be equal to a time length of the first target time unit; the terminal device determines a second frequency-domain resource, wherein the second frequency-domain resource is determined to transmit a second physical channel in a second target time unit by using a second TTI, the second TTI may not be smaller than the first TTI, and the second target time unit may at least partially overlap with the first target time unit; and the terminal device determines a third frequency-domain resource, wherein the third frequency-domain resource may include at least part of frequency-domain resources of the second frequency-domain resource and the third frequency-domain resource may be a maximum available frequency-domain resource for supporting transmission of the first physical channel in the first target time unit by using the first TTI.

In combination with the first aspect, in a first possible implementation mode of the first aspect, the third frequency-domain resource may further include at least part of frequency-domain resources of the first frequency-domain resource.

In the embodiments of the disclosure, the terminal device may determine a sum of the first frequency-domain resource and the second frequency-domain resource as the third frequency-domain resource. Of course, in the embodiments of the disclosure, a sum of part of frequency-domain resources of the first frequency-domain resource and part of frequency-domain resources of the second frequency-domain resource may also be determined as the third frequency-domain resource, or part of frequency-domain resources of the second frequency-domain resource are determined as the third frequency-domain resource.

For example, it is predetermined that a maximum number of Physical Resource Blocks (PRBs) available for transmitting the first physical channel in the first target time unit is N, wherein a value of N may be limited by a bit number of an information field for indicating locations of the PRBs in Downlink Control Information (DCI). For example, if 9-bit information in the DCI is fixedly used to indicate the locations of the PRBs, the maximum number of the RPBs is 25. Alternatively, the value of N is configured by a base station or directly predetermined by a protocol to be 25.

If a number of PRBs included in the second frequency-domain resource is M and M is not larger than N, it is determined that the M PRBs in the second frequency-domain resource and N-M PRBs in the first frequency-domain resource form the third frequency-domain resource, wherein the N-M PRBs in the first frequency-domain resource may be selected according to a predetermined principle, and may be first N-M PRBs or last N-M PRBs according to a numbering sequence of PRBs.

If the number of the PRBs included in the second frequency-domain resource is M and M is larger than N, it is determined that the first N or last N PRBs in the second frequency-domain resource form the third frequency-domain resource.

Therefore, in the embodiments of the disclosure, at least part of frequency-domain resources allocated to the second physical channel are determined as resources available for transmitting the first physical channel, such that resource waste may be avoided.

In combination with the first aspect or the first possible implementation mode thereof, in a second possible implementation mode of the first aspect, the method may further include that: the terminal device determines a target frequency-domain resource from the third frequency-domain resource; and the terminal device utilizes the target frequency-domain resource to send the first physical channel to a network device or receive the first physical channel sent by the network device in the first target time unit by using the first TTI.

In combination with the second possible implementation mode of the first aspect, in a third possible implementation mode of the first aspect, the operation that the terminal device determines the target frequency-domain resource from the third frequency-domain resource may include that: first DCI sent by the network device is received, wherein the first DCI may be configured to indicate a location of the target frequency-domain resource in the third frequency-domain resource; and the target frequency-domain resource is determined on the basis of the DCI.

In combination with the third possible implementation mode of the first aspect, in a fourth possible implementation mode of the first aspect, the method may further include that: PRBs in the third frequency-domain resource are continuously re-sequenced, wherein the first downlink control information may be configured to indicate a re-sequencing number of the PRB corresponding to the target frequency-domain resource to indicate the location of the target frequency-domain resource in the third frequency-domain resource.

In the embodiments of the disclosure, continuously re-sequencing the PRBs in the third resource may reduce a control signaling overhead.

In combination with the first aspect or any abovementioned possible implementation mode thereof, in a fifth possible implementation mode of the first aspect, the method may further include that: the terminal device receives a DCI in a Physical Downlink Control Channel (PDCCH), or receives a DCI on the first frequency-domain resource in the first target time unit.

In combination with the first aspect or any abovementioned possible implementation mode thereof, in a sixth possible implementation mode of the first aspect, before the operation that the terminal device determines the third frequency-domain resource, the method may further include that: at least one of the following information sent by the network device is received: first configuration information for indicating the first resource, second configuration information for indicating the second resource, third configuration information for indicating the terminal device to send or receive the first physical channel by using the first TTI, or fourth configuration information for indicating the terminal device to send or receive the second physical channel by using the second TTI.

In combination with the first aspect or any abovementioned possible implementation mode thereof, in a seventh possible implementation mode of the first aspect, the first physical channel may be a dynamically scheduled Physical Downlink Shared Channel (PDSCH), and the second physical channel may be a semi-persistently scheduled PDSCH; or, the first physical channel may be a dynamically scheduled Physical Uplink Shared Channel (PUSCH), and the second physical channel may be a semi-persistently scheduled PUSCH; or, the first physical may be a dynamically scheduled PUSCH, the second physical channel may be dynamically scheduled PUSCH, and the time length of the first target time unit may be smaller than a time length of the second target time unit.

In combination with the seventh possible implementation mode of the first aspect, in an eighth possible implementation mode of the first aspect, when the first physical channel is a PUSCH, subframes to which the first target time unit and the second target time unit belong may be uplink subframes; and/or, when the first physical channel is a PDSCH, the subframes to which the first target time unit and the second target time unit belong may be downlink subframes or Time Division Duplex (TDD)-characterized subframes.

A second aspect provides a communication method, which may include that: a network device determines a first frequency-domain resource, wherein the first frequency-domain resource may be an available resource which is preconfigured for supporting transmission of a first physical channel in a first target time unit by using a first TTI, and a time length of the first TTI may be equal to a time length of the first target time unit; the network device determines a second frequency-domain resource, wherein the second frequency-domain resource may be determined to transmit a second physical channel in a second target time unit by using a second TTI, the second TTI may not be smaller than the first TTI, and the second target time unit may at least partially overlap with the first target time unit; and the network device determines a third frequency-domain resource, wherein the third frequency-domain resource may include at least part of frequency-domain resources of the second frequency-domain resource and the third frequency-domain resource may be a maximum available frequency-domain resource for supporting transmission of the first physical channel in the first target time unit by using the first TTI.

In combination with the second aspect, in a first possible implementation mode of the second aspect, the third frequency-domain resource may further include at least part of frequency-domain resources of the first frequency-domain resource.

In combination with the second aspect or the first possible implementation mode thereof, in a second possible implementation mode of the second aspect, the method may further include that: the network device determines a target frequency-domain resource from the third frequency-domain resource; and the network device utilizes the target frequency-domain resource to send the first physical channel to terminal device or receive the first physical channel sent by the terminal device in the first target time unit by using the first TTI.

In combination with the second possible implementation mode of the second aspect, in a third possible implementation mode of the second aspect, the method may further include that: the network device sends a first DCI to the terminal device which determines the target frequency-domain resource based on the first DCI, wherein the first DCI may be configured to indicate a location of the target frequency-domain resource in the third frequency-domain resource.

In combination with the third possible implementation mode of the second aspect, in a fourth possible implementation mode of the second aspect, the method may further include that: PRBs in the third frequency-domain resource are continuously re-sequenced, wherein the first downlink control information may be configured to indicate a re-sequencing number of the PRB corresponding to the target frequency-domain resource to indicate the location of the target frequency-domain resource in the third frequency-domain resource.

In combination with the second aspect or any abovementioned possible implementation mode thereof, in a fifth possible implementation mode of the second aspect, the method may further include that: the network device sends a DCI in a PDCCH, or sends a DCI on the first frequency-domain resource in the first target time unit.

In combination with the second aspect or any abovementioned possible implementation mode thereof, in a sixth possible implementation mode of the second aspect, the method may further include that: at least one of the following information is sent to the terminal device: first configuration information for indicating the first resource, second configuration information for indicating the second resource, third configuration information for indicating the terminal device to send or receive the first physical channel by using the first TTI, or fourth configuration information for indicating the terminal device to send or receive the second physical channel by using the second TTI.

In combination with the second aspect or any abovementioned possible implementation mode thereof, in a seventh possible implementation mode of the second aspect, the first physical channel may be a dynamically scheduled PDSCH, and the second physical channel may be a semi-persistently scheduled PDSCH; or, the first physical channel may be a dynamically scheduled PUSCH, and the second physical channel may be a semi-persistently scheduled PUSCH; or, the first physical may be a dynamically scheduled PUSCH, the second physical channel may be dynamically scheduled PUSCH, and the time length of the first target time unit may be smaller than a time length of the second target time unit.

In combination with the seventh possible implementation mode of the second aspect, in an eighth possible implementation mode of the second aspect, when the first physical channel is a PUSCH, subframes to which the first target time unit and the second target time unit belong may be uplink subframes; and/or, when the first physical channel is a PDSCH, the subframes to which the first target time unit and the second target time unit belong may be downlink subframes or TDD-characterized subframes.

A third aspect provides a terminal, which is configured to execute the method in the first aspect or any optional implementation mode of the first aspect. Specifically, the communication equipment includes modules configured to execute the method in the first aspect or any possible implementation mode of the first aspect.

A fourth aspect provides a network device, which is configured to execute the method in the second aspect or any optional implementation mode of the second aspect. Specifically, the communication equipment includes modules configured to execute the method in the second aspect or any possible implementation mode of the second aspect.

A fifth aspect provides a terminal device, which includes: a memory and a processor, wherein the memory is configured to store an instruction, the processor is configured to execute the instruction stored in the memory, and when the instruction stored in the memory is executed by the processor, such execution enables the processor to execute the method in the first aspect or any optional implementation mode of the first aspect.

A sixth aspect provides a network device, which includes: a memory and a processor, wherein the memory is configured to store an instruction, the processor is configured to execute the instruction stored in the memory, and when the instruction stored in the memory is executed by the processor, such execution enables the processor to execute the method in the second aspect or any optional implementation mode of the second aspect.

A seventh aspect provides a computer storage medium, in which a program code is stored, wherein the program code may be configured to indicate the method in the first aspect or any optional implementation mode of the first aspect to be executed.

An eighth aspect provides a computer storage medium, in which a program code is stored, wherein the program code may be configured to indicate the method in the second aspect or any optional implementation mode of the second aspect to be executed.

BRIEF DESCRIPTION OF DRAWINGS

In order to describe the technical solutions of the embodiments of the disclosure more clearly, the drawings required to be used in descriptions about the embodiments or a conventional art will be simply introduced below. Obviously, the drawings described below are only some embodiments of the disclosure. Other drawings may further be obtained by those of ordinary skilled in the art according to these drawings without creative work.

DETAILED DESCRIPTION

Figure 1:
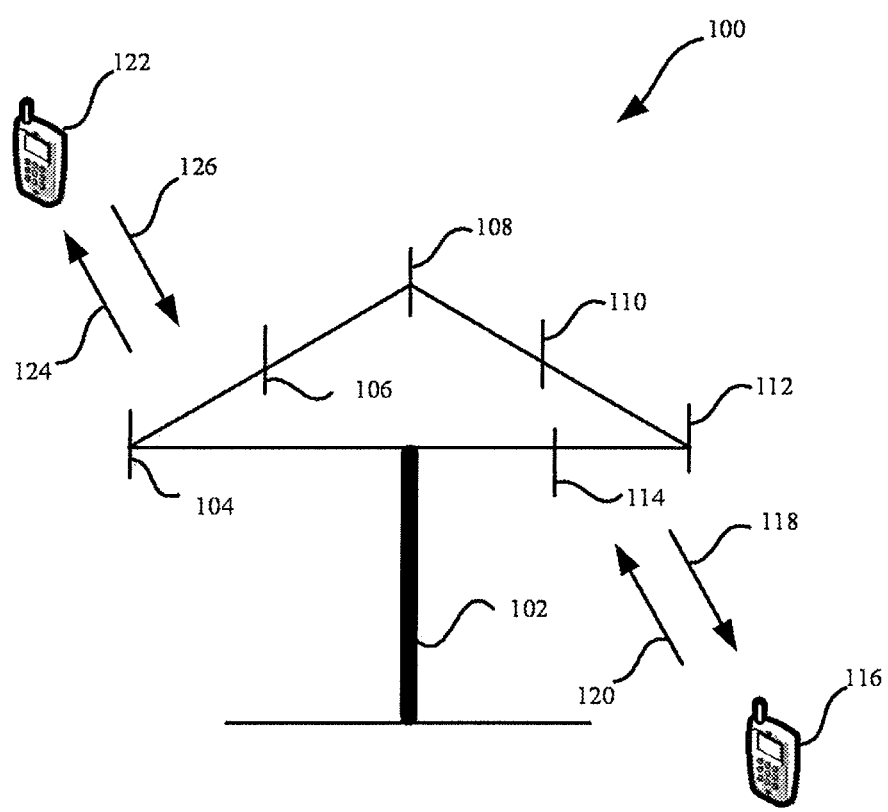
FIG. 1 is a diagram of an application scenario according to an embodiment of the disclosure.

The technical solutions in the embodiments of the disclosure will be clearly and completely described below in combination with the drawings in the embodiments of the disclosure. Obviously, the described embodiments are not all embodiments but part of embodiments of the disclosure. All other embodiments obtained by those of ordinary skilled in the art on the basis of the embodiments in the disclosure without creative work shall fall within the scope of protection of the disclosure.

The technical solutions in the embodiments of the disclosure will be clearly and completely described below in combination with the drawings in the embodiments of the disclosure. Obviously, the described embodiments are not all embodiments but part of embodiments of the disclosure. All other embodiments obtained by those of ordinary skilled in the art on the basis of the embodiments in the disclosure without creative work shall fall within the scope of protection of the disclosure.

Terms "part", "module", "system" and the like used in the specification are adopted to represent a computer related entity, hardware, firmware, hardware and software combination, software or software in execution. For example, a part may be, but not limited to, a process running on a processor, the processor, an object, an executable file, an execution thread, a program and/or a computer. The drawings illustrate that an disclosure running on a computing device and the computing device may both be parts. One or more parts may reside in a process and/or an execution thread, and the parts may be located on a computer and/or distributed between two or more computers. In addition, these parts may be executed from various computer-readable media with various data structures stored thereon. The parts may communicate through local and/or remote processes according to, for example, signals with one or more data groups (for example, data from two parts interacting with another part of a local system, a distributed system and/or a network, for example, the Internet interacting with another system through a signal).

Each embodiment of the disclosure is described in combination with a terminal device and a network device. The terminal device may also be called as an access terminal, a user unit, a user station, a mobile radio station, a mobile station, a remote station, a remote terminal, mobile equipment, a user terminal, a terminal, wireless communication equipment, a user agent or a user device. The access terminal may be a cell phone, a cordless phone, a Session Initiation Protocol (SIP) phone, a Wireless Local Loop (WLL) station, a Personal Digital Assistant (PDA), handheld equipment with a wireless communication function, computing equipment or other processing equipment connected to a wireless modem, vehicle-mounted equipment, wearable equipment and terminal equipment in a future 5th-Generation (5G) network. The network device may be configured to communicate with mobile equipment, and the network device may be a Base Transceiver Station (BTS) in a Global System for Mobile Communication (GSM) or Code Division Multiple Access (CDMA), may also be an NB (NodeB) in Wideband Code Division Multiple Access (WCDMA), and may further be an Evolutional Node B (eNB or eNodeB) in LTE, or a relay station or access point, or vehicle-mounted equipment, wearable equipment and network equipment in the future 5G network.

In addition, each aspect or characteristic of the disclosure may be implemented into a method, a device or a product programmed with a standard and/or using an engineering technology. The term "product" used in the disclosure covers a computer program which may be accessed from any computer-readable device, carrier or medium. For example, the computer-readable medium may include, but not limited to: a magnetic storage device (for example, a hard disk, a floppy disk or a magnetic tape), an optical disk (for example, a Compact Disk (CD), a Digital Versatile Disk (DVD)), a smart card and a flash memory (for example, an Erasable Programmable Read-Only Memory (EPROM), a card, a stick or a key driver). In addition, various storage media described in the disclosure may represent one or more devices and/or other machine-readable media configured to store information. The term "machine-readable medium" may include, but not limited to, a wireless channel and various other media capable of storing, including and/or carrying instructions and/or data.

FIG. 1 is a schematic diagram of a communication system according to an embodiment of the disclosure. As illustrated in FIG. 1, the communication system 100 includes a network device 102, and the network device 102 may include multiple antenna groups. For example, one antenna group may include antennae 104 and 106, the other antenna group may include antennae 108 and 110, and an additional group may include antennae 112 and 114. In FIG. 1, each antenna group includes two antennae, but more or fewer antennae may be used for each group. The network device 102 may additionally include a sender chain and a receiver chain. Those of ordinary skilled in the art may know that all of them may include multiple parts (for example, a processor, a modulator, a multiplexer, a demodulator, a demultiplexer or an antenna) related to signal sending and receiving.

The network device 102 may communicate with multiple terminal devices (for example, a terminal device 116 and a terminal device 122). However, it can be understood that the network device 102 may communicate with any number of terminal devices like the terminal device 116 or 122. The terminal devices 116 and 122 may be, for example, cell phones, smart phones, portable computers, handheld communication equipment, handheld computing equipment, satellite radio devices, global positioning systems, PDAs and/or any other proper equipment configured for communication on the wireless communication system 100.

As illustrated in FIG. 1, the terminal device 116 communicates with the antennae 112 and 114, wherein the antennae 112 and 114 send information to the terminal device 116 through a forward link 118 and receive information from the terminal device 116 through a reverse link 120. In addition, the terminal device 122 communicates with the antennae 104 and 106, wherein the antennae 104 and 106 send information to the terminal device 122 through a forward link 124 and receive information from the terminal device 122 through a reverse link 126.

For example, in a Frequency Division Duplex (FDD) system, for example, the forward link 118 may use a frequency band different from that used by the reverse link 120, and the forward link 124 may use a frequency band different from that used by the reverse link 126.

For another example, in a TDD system and a full duplex system, the forward link 118 and the reverse link 120 may use the same frequency band, and the forward link 124 and the reverse link 126 may use the same frequency band.

Each group of antennae and/or a region designed for communication are called as sectors/a sector of the network device 102. For example, the antenna group may be designed to communicate with terminal devices in a sector of coverage area of the network device 102. In a process that the network device 102 communicates with the terminal devices 116 and 122 through the forward links 118 and 124 respectively, a sending antenna of the network device 102 may use beamforming to improve signal-to-noise ratios of the forward links 118 and 124. In addition, compared with a manner that a network device sends signals to all its terminal devices through a single antenna, mobile devices in an adjacent cell may suffer from less interference when the network device 102 sends signals to the terminal devices 116 and 122 randomly scattered in the related coverage area by virtue of beamforming.

In a given time, the network device 102, the terminal device 116 or the terminal device 122 may be a wireless communication sending device and/or a wireless communication receiving device. When data is sent, the wireless communication sending device may code the data for transmission. Specifically, the wireless communication sending device may acquire (for example, generation, receiving from another communication device or storage in a memory) a certain number of data bits to be sent to the wireless communication receiving device through a channel. The data bits may be included in a transmission block (or multiple transmission blocks) of the data, and the transmission block may be segmented to generate multiple code blocks.

The communication system in the embodiments of the disclosure has been described above in combination with FIG. 1 in detail, and a communication method and communication equipment applied to the system will be described below in combination with FIG. 2 to FIG. 15 in detail.

Figure 2:
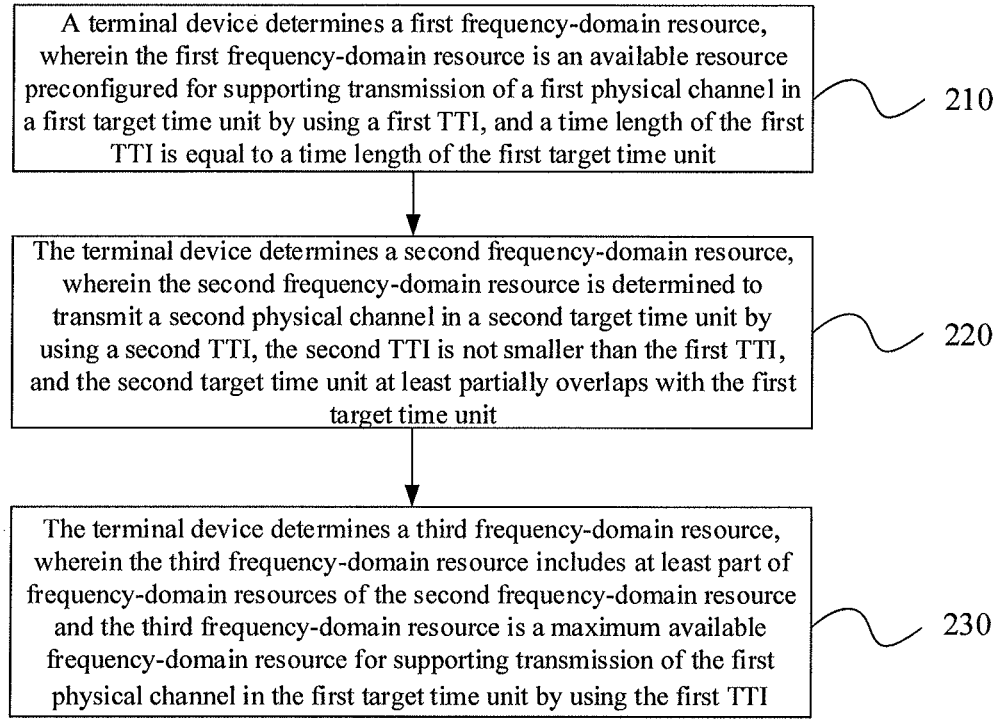
FIG. 2 is a schematic flowchart of a communication method according to an embodiment of the disclosure.

FIG. 2 is a schematic block diagram of a communication method 200 according to an embodiment of the disclosure.

In 210, a terminal device determines a first frequency-domain resource, wherein the first frequency-domain resource is an available resource preconfigured for supporting transmission of a first physical channel in a first target time unit by using a first TTI, and a time length of the first TTI is equal to a time length of the first target time unit.

In 220, the terminal device determines a second frequency-domain resource, wherein the second frequency-domain resource is determined to transmit a second physical channel in a second target time unit by using a second TTI, the second TTI is not smaller than the first TTI, and the second target time unit at least partially overlaps with the first target time unit.

In 230, the terminal device determines a third frequency-domain resource, wherein the third frequency-domain resource includes at least part of frequency-domain resources of the second frequency-domain resource and the third frequency-domain resource is a maximum available frequency-domain resource for supporting transmission of the first physical channel in the first target time unit by using the first TTI.

Optionally, the third frequency-domain resource further includes at least part of frequency-domain resources of the first frequency-domain resource.

For convenient understanding, the technical problem which may be solved by the embodiments of the disclosure will be described below in combination with FIG. 3, wherein there is made such a hypothesis that the first TTI is 0.5 ms and the second TTI is 1 ms.

Data transmitted by virtue of 1 ms TTI requires a longer scheduling processing delay. For transmission of the second physical channel with the 1 ms TTI in a subframe n, corresponding scheduling is required to be started from a subframe n−4. However, for transmission of the second physical channel with 0.5 ms TTI in the subframe n, corresponding scheduling may be started from a subframe n−2. That is, the second frequency-domain resource in the second target time unit of the subframe n has been allocated to a certain terminal device to transmit the second physical channel at the subframe n−4, but the first frequency-domain resource in the first target time unit of the subframe n is allocated to the terminal device to transmit the first physical channel at the subframe n−2. Since the second target time unit includes the first target time unit and a transmission object is the same terminal device, if the same terminal device may not receive or send multiple physical channels at the same time, the frequency-domain resource configured to transmit the first physical channel may be wasted. Moreover, scheduling of the first physical channel is later than the second physical channel, and when transmission of the first physical channel is determined, the resource for transmitting the second physical channel in the subframe n has been allocated to a certain terminal device and may not be allocated to another terminal device to transmit a physical channel with the second TTI anymore, so that the resource may be wasted.

Therefore, in the embodiment of the disclosure, at least part of frequency-domain resources allocated to the second physical channel are determined as resources available for transmitting the first physical channel, which may avoid resource waste.

Optionally, a network device may send first configuration information to the terminal device, wherein the first configuration information is configured to indicate the first frequency-domain resource, so that the terminal device may determine the first frequency-domain resource on the basis of the first configuration information.

Optionally, the network device may send second configuration information to the terminal device, wherein the second configuration information is configured to indicate the second frequency-domain resource, so that the terminal device may determine the second frequency-domain resource on the basis of the second configuration information.

Optionally, the network device may send third configuration information to the terminal device, wherein the third configuration information is configured to indicate the terminal device to transmit the first physical channel in the first target time unit by using the first TTI, so that the terminal device may adopt the first TTI to transmit the first physical channel in the first target time unit on the basis of the third configuration information.

Optionally, the network device may send fourth configuration information to the terminal device, wherein the fourth configuration information is configured to indicate the terminal device to transmit the second physical channel in the second target time unit by using the second TTI, so that the terminal device may adopt the second TTI to transmit the second physical channel in the second target time unit on the basis of the fourth configuration information.

Figure 3:
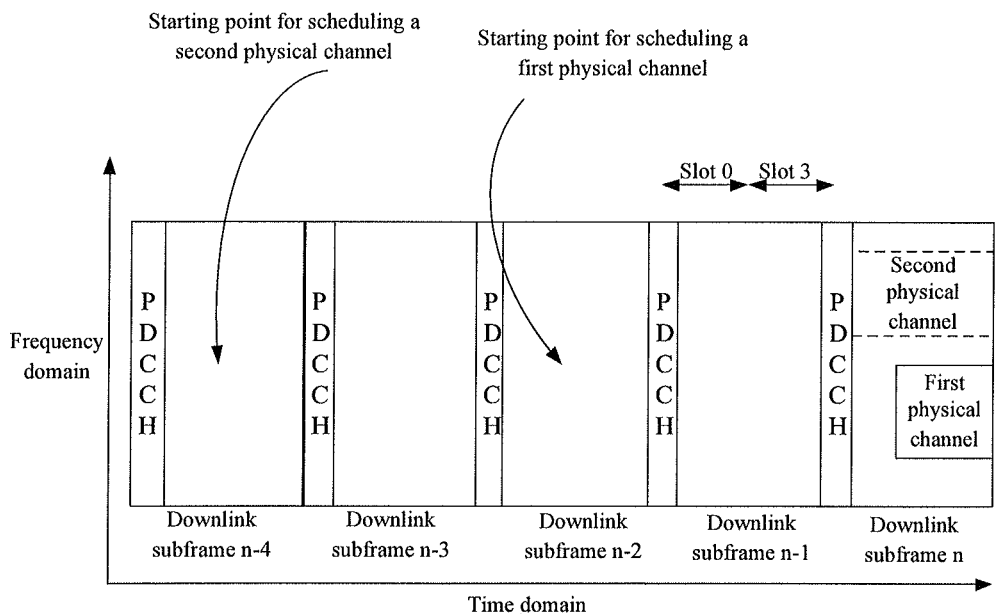
FIG. 3 is a schematic diagram of resource allocation according to an embodiment of the disclosure.

In the embodiment of the disclosure, the first frequency-domain resource refers to an available resource preconfigured for transmitting the first physical channel by using the first TTI, for example, as illustrated in FIG. 3, a frequency-domain resource scheduled at the subframe n−2 and configured to transmit the first physical channel in the subframe n. Herein, the first frequency-domain resource may include multiple PRBs, that is, the first frequency-domain resource may be called as a resource pool, and the terminal device may select a PRB for transmitting the first physical channel from the resource pool according to an indication from a base station.

In the embodiment of the disclosure, the second frequency-domain resource refers to a frequency-domain resource determined to transmit the second physical channel by using the second TTI, for example, as illustrated in FIG. 3, a frequency-domain resource scheduled at the subframe n−4 and configured to transmit the second physical channel in the subframe n.

In the embodiment of the disclosure, the terminal device may determine a sum of the first frequency-domain resource and the second frequency-domain resource as the third frequency-domain resource, that is, the maximum available resource for transmitting the first physical channel in the first target time unit, i.e., the third frequency-domain resource, which may also be called as a resource pool. The terminal device may select the PRB for transmitting the first physical channel from the resource pool according to the indication from the base station.

Figure 4:
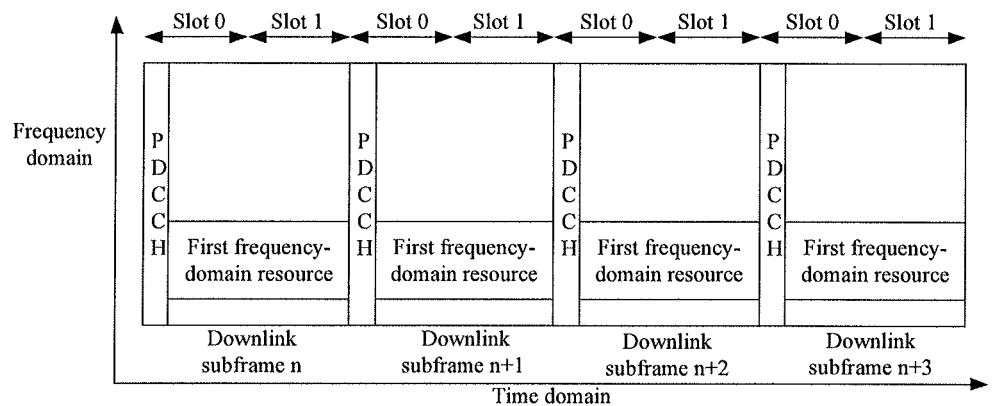
FIG. 4 is a schematic diagram of resource allocation according to an embodiment of the disclosure.
Figure 5:
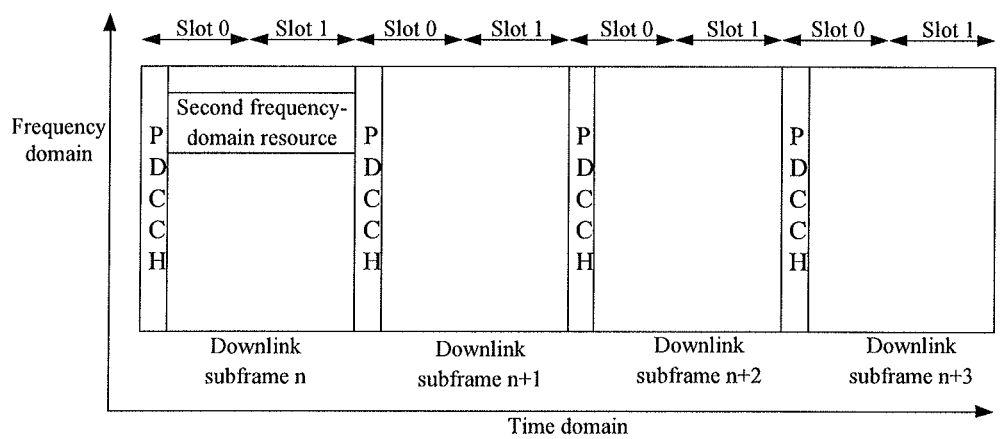
FIG. 5 is a schematic diagram of resource allocation according to an embodiment of the disclosure.
Figure 6:
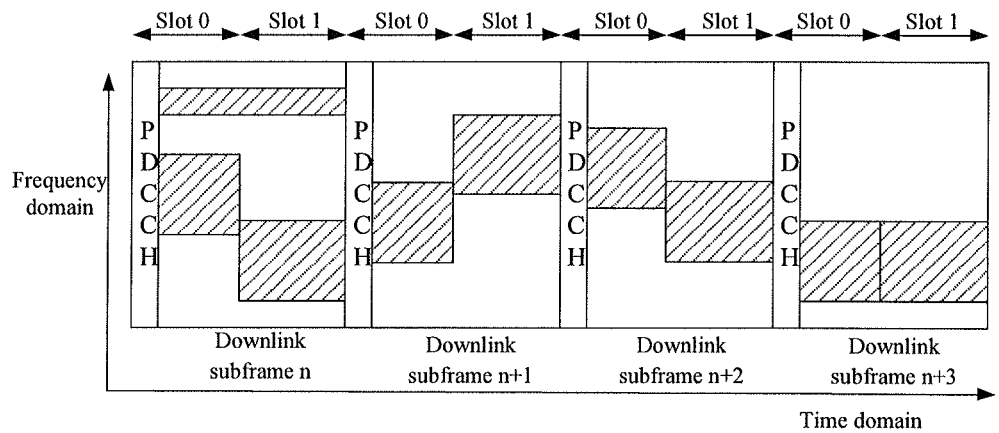
FIG. 6 is a schematic diagram of resource allocation according to an embodiment of the disclosure.

For example, resources illustrated in FIG. 4 are available time-frequency resources preconfigured for transmitting the first physical channel, wherein the TTI corresponding to the first physical channel may be 0.5 ms, that is, each subframe has two first target time units. Resources illustrated in FIG. 5 are time-frequency resources configured for transmitting the second physical channel, wherein the TTI corresponding to the second physical channel may be 1 ms, that is, each subframe has one second target time unit. Then, maximum available frequency-domain resources for transmitting the first physical channel in each first target time unit are illustrated in FIG. 6.

Of course, in the embodiment of the disclosure, a sum of part of frequency-domain resources of the first frequency-domain resource and part of frequency-domain resources of the second frequency-domain resource may also be determined as the third frequency-domain resource, or part of frequency-domain resources of the second frequency-domain resource are determined as the third frequency-domain resource.

For example, it is predetermined that a maximum number of PRBs available for transmitting the first physical channel in the first target time unit is N, wherein a value of N may be limited by a bit number of an information field for indicating locations of the PRBs in a DCI. For example, if 9-bit information in the DCI is fixedly used to indicate the locations of the PRBs, the maximum number of the RPBs is 25. Alternatively, the value of N is configured by the base station or directly predetermined by a protocol to be 25.

If a number of PRBs included in the second frequency-domain resource is M and M is not larger than N, it is determined that the M PRBs in the second frequency-domain resource and N-M PRBs in the first frequency-domain resource form the third frequency-domain resource, wherein the N-M PRBs in the first frequency-domain resource may be selected according to a predetermined principle, and may be first N-M PRBs or last N-M PRBs according to a numbering sequence of PRBs.

If the number of the PRBs included in the second frequency-domain resource is M and M is larger than N, it is determined that the first N or last N PRBs in the second frequency-domain resource form the third frequency-domain resource.

In the embodiment of the disclosure, after the third frequency-domain resource is determined, the terminal device determines a target frequency-domain resource from the third frequency-domain resource; and the terminal device utilizes the target frequency-domain resource to send the first physical channel to the network device or receive the first physical channel sent by the network device in the first target time unit by using the first TTI.

Specifically, before the first frequency-domain resource is utilized, the network device may send a DCI to the terminal device to specifically indicate a location of the target frequency-domain resource in the third frequency-domain resource.

Optionally, the terminal device and the network device may renumber PRBs of the third frequency-domain resource according to the same rule, and the network device includes a re-sequencing number of the PRB corresponding to the target frequency-domain resource required to be adopted by the terminal device in the DCI, so that the terminal device may determine the target frequency-domain resource in the third frequency-domain resource on the basis of the DCI.

Figure 7:
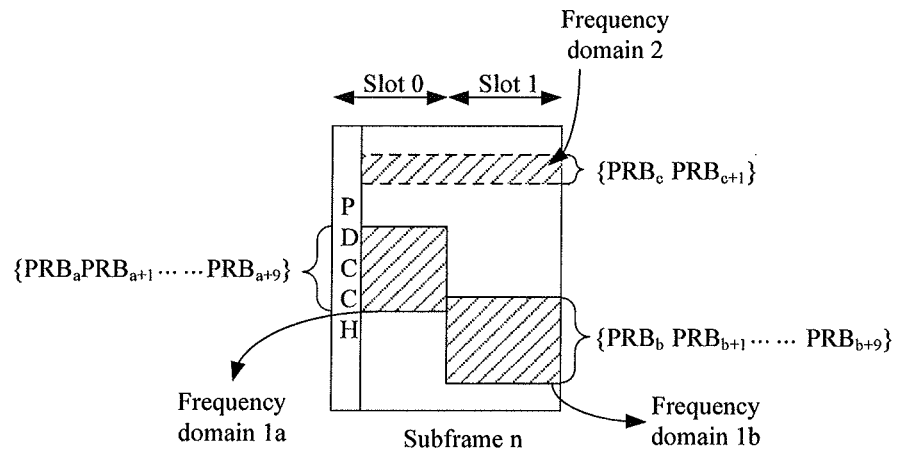
FIG. 7 is a schematic diagram of resource allocation and re-numbering of PRBs according to an embodiment of the disclosure.

For example, as illustrated in FIG. 7, the subframe n is the second target time unit, and a slot 0 and a slot 1 are two different first target time units. A frequency domain 2 is a second frequency-domain resource originally determined to transmit the second physical channel, and includes PRBs $\{PRB_c\ PRB_{c+1}\}$; a frequency domain 1a is a first frequency-domain resource preconfigured to transmit the first physical channel in the slot 0, and includes PRBs $\{PRB_a\ PRB_{a+1}\ldots PRB_{a+9}\}$; and a frequency domain 1b is a first frequency-domain resource preconfigured to transmit the first physical channel in the slot 1, and includes PRBs $\{PRB_b\ PRB_{b+1}\ldots PRB_{b+9}\}$. It is determined that a maximum available frequency-domain resource for transmitting the first physical channel in the slot 0 is a sum of the frequency domain 1a and the frequency domain 2, i.e., the PRBs $\{PRB_a\ PRB_{a+1}\ldots PRB_{a+9}\ PRB_c\ PRB_{c+1}\}$. It is determined that a maximum available frequency-domain resource for transmitting the first physical channel in the slot 1 is a sum of the frequency domain 1b and the frequency domain 2, i.e., the PRBs $\{PRB_b, PRB_{b+1}\ldots PRB_{b+9}\ PRB_c\ PRB_{c+1}\}$, wherein the PRBs in { } are continuously numbered, numberings of the PRBs in { } are in ascending order, $PRB_i$ refers to a specific PRB, and i is not a number of the PRB.

The PRBs in the first frequency-domain resource are sequenced before the second frequency-domain resource in FIG. 7, which will not form any limit to the embodiment of the disclosure. For example, the PRBs in the second frequency-domain resource are sequenced before the PRBs in the first frequency-domain resource, or the PRBs in the first frequency-domain resource and the PRBs in the second frequency-domain resource are alternately arranged.

The maximum number of the PRBs indicated by the PRB resource indication information field in the DCI is not smaller than a total number of the PRBs in the third frequency-domain resource.

Therefore, in the embodiment of the disclosure, continuously renumbering the PRBs in the third frequency-domain resource may reduce a control signaling overhead.

Of course, the sent DCI is configured to indicate the sequencing number of the target frequency-domain resource, and may further contain other control information.

In the embodiment of the disclosure, the DCI may further be sent through a PDCCH.

Optionally, in the embodiment of the disclosure, different target time units corresponding to the same TTI may include the same frequency-domain resources. For example, as illustrated in FIG. 4, each subframe has two target time units which correspond to the slot 0 and the slot 1 respectively. Each target time unit corresponds to the same frequency-domain resources.

Figure 8:
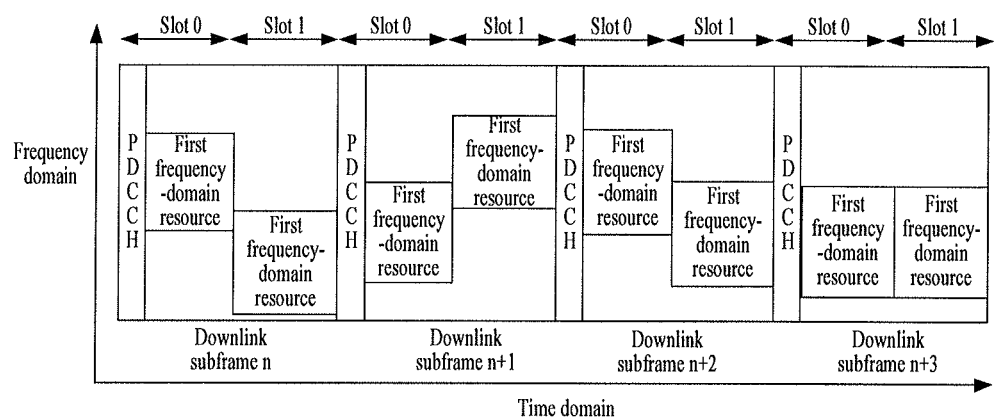
FIG. 8 is a schematic diagram of resource allocation according to an embodiment of the disclosure.

Optionally, in the embodiment of the disclosure, the frequency-domain resources of the target time units corresponding to the same TTI may be completely different or partially different. For example, as illustrated in FIG. 8, each subframe has two target time units corresponding to the slot 0 and the slot 1 respectively. Frequency-domain resources corresponding to any two target time units may be partially the same, completely different or completely the same.

The embodiment of the disclosure may be used for uplink transmission and may also be used for downlink transmission. No matter whether the embodiment of the disclosure is used for uplink transmission or downlink transmission, the network device is required to determine the first frequency-domain resource, the second frequency-domain resource and the third frequency-domain resource. After the network device determines the third frequency-domain resource, the target frequency-domain resource may be determined from the third frequency-domain resource. The location of the target frequency-domain resource in the third frequency-domain resource is notified to the terminal device, such that the terminal device may determine the target frequency-domain resource and utilize the target frequency-domain resource to send the first physical channel or receive the first physical channel in the first target time unit.

Optionally, in case of uplink transmission, the network device may send the DCI for indicating the target frequency-domain resource to the terminal device in advance, so that the terminal device, when receiving the DCI, determines the target frequency-domain resource, then performs data coding-modulation and sends uplink data on the target frequency-domain resource in the first target time unit. The network device may receive the uplink data on the target frequency-domain resource in the first target time unit.

Example 1 the first physical channel is a dynamically scheduled PUSCH and the second physical channel is a semi-persistently scheduled PUSCH.

For example, for an FDD system, if the TTI of the first physical channel is 0.5 ms and the TTI of the second physical channel is 1 ms, the DCI corresponding to the first physical channel transmitted in the slot 0 of the subframe n is transmitted in the slot 0 of the subframe n−2, and scheduling information for the second physical channel is semi-persistently configured, and namely is repeatedly used after being indicated once by the base station.

Example 2 the first physical channel is a dynamically scheduled PUSCH, the second physical channel is a dynamically scheduled PUSCH and the TTI of the second physical channel is larger than the TTI of the first physical channel.

For example, for the FDD system, if the TTI of the first physical channel is 0.5 ms and the TTI of the second physical channel is 1 ms, the DCI corresponding to the first physical channel transmitted in the slot 0 of the subframe n is transmitted in the slot 0 of the subframe n−2, and DCI corresponding to the second physical channel transmitted in the subframe n is transmitted in the subframe n−4.

Optionally, during uplink transmission, subframes corresponding to the target time units are uplink subframes.

Optionally, the first physical channel is a dynamically scheduled PUSCH, and the second physical channel is a semi-persistently scheduled PUSCH; or, the first physical channel is a dynamically scheduled PUSCH, the second physical channel is a dynamically scheduled PUSCH, and the time length of the first target time unit is smaller than a time length of the second target time unit.

Figure 9:
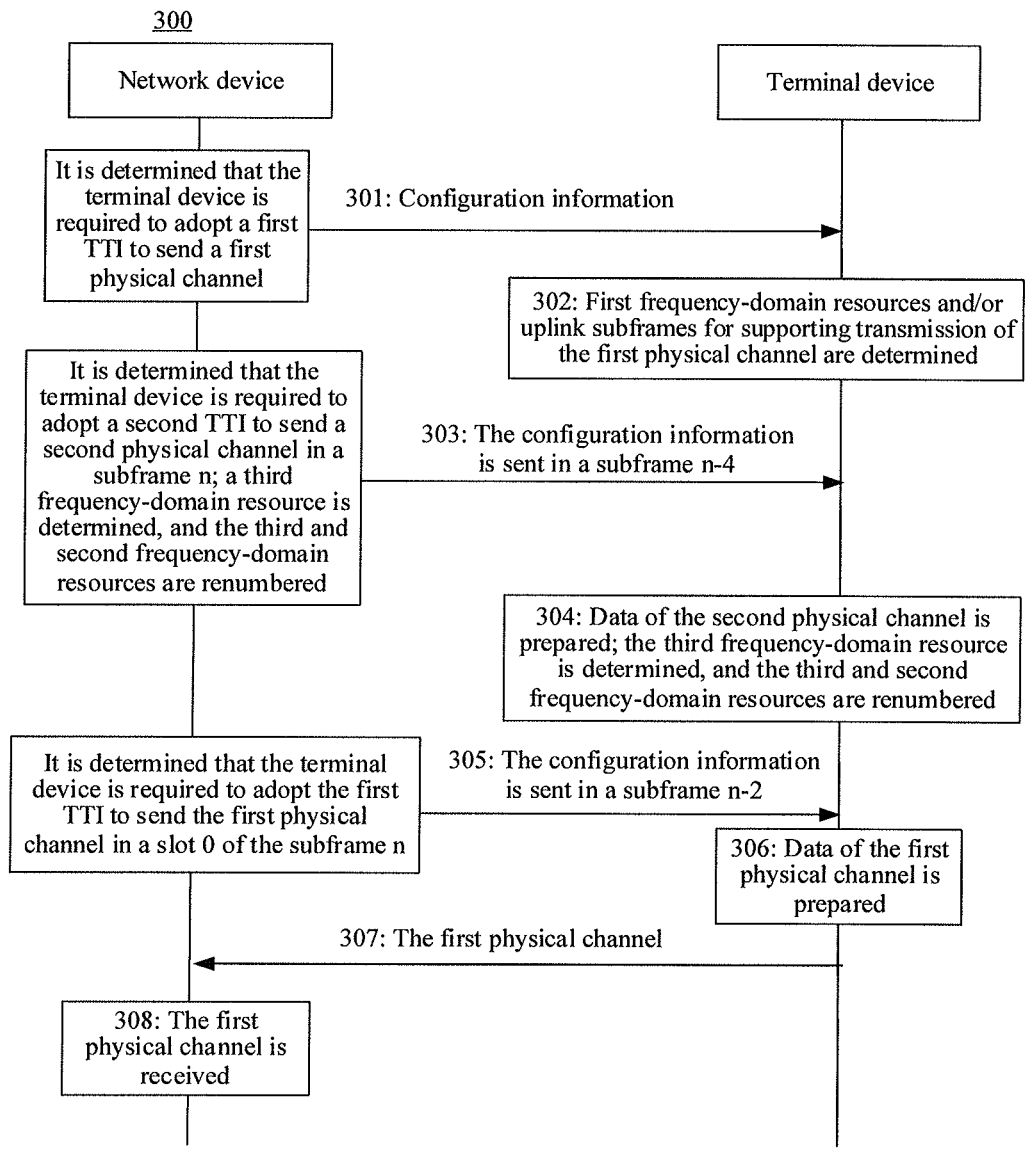
FIG. 9 is a schematic flowchart of a communication method according to an embodiment of the disclosure.

For clearer understanding, uplink transmission will be described below in combination with a method 300 illustrated in FIG. 9 in detail.

In 301, a network device determines that a terminal device is required to adopt a first TTI to send a first physical channel, wherein the first physical channel is a dynamically scheduled PUSCH, and its TTI is 0.5 ms. The network device determines a first frequency-domain resource for sending the first physical channel by the terminal device in each uplink subframe and sends configuration information to the terminal to notify the first frequency-domain resources and/or the uplink subframes for supporting the terminal to send the first physical channel.

In 302, after receiving the configuration information sent by the network device, the terminal device determines the first frequency-domain resources and/or the uplink subframes for supporting transmission of the first physical channel.

In 303, the network device determines that the terminal device is required to adopt a second TTI to send a second physical channel in a subframe n, wherein the second physical channel is a dynamically scheduled PUSCH, and its TTI is 1 ms. The network device determines a second frequency-domain resource for sending the second physical channel by the terminal device and sends configuration information to the terminal device in a subframe n−4. The configuration information is configured to indicate the terminal device to transmit the second physical channel in the subframe n by using the second TTI and a frequency-domain resource for transmitting the second physical channel is the second frequency-domain resource. The network device determines a third frequency-domain resource, and the third frequency-domain resource includes at least part of the first frequency-domain resource and at least part of the second frequency-domain resource. The network device re-sequences all PRBs corresponding to the third frequency-domain resource and the second frequency-domain resource.

In 304, after receiving the configuration information sent by the network device in the subframe n−4, the terminal device may start to prepare data of the second physical channel to be sent in the subframe n. The terminal device determines the third frequency-domain resource, and the third frequency-domain resource includes at least part of the first frequency-domain resource and at least part of the second frequency-domain resource. The terminal device re-sequences all the PRBs corresponding to the third frequency-domain resource and the second frequency-domain resource.

In 305, the network device determines that the terminal device is required to adopt the first TTI to send the first physical channel in a slot 0 of the subframe n, wherein the first physical channel is a dynamically scheduled PUSCH, and its TTI is 0.5 ms. The network device sends a DCI to the terminal device in a slot 0 of a subframe n−2, wherein the DCI is configured to indicate a target frequency-domain resource for transmitting the first physical channel by the terminal device, and the target frequency-domain resource belongs to the third frequency-domain resource.

In 306, after receiving the DCI sent by the network device in the slot 0 of the subframe n−2, the terminal device may start to prepare data of the first physical channel to be sent in the subframe n and stop preparing the data of the second physical channel to be sent in the subframe n.

In 307, the terminal device utilizes the target frequency-domain resource to send the first physical channel to the network device in the slot 0.

In 308, the network device receives the first physical channel sent through the target frequency-domain resource from the terminal device in the slot 0.

Figure 10:
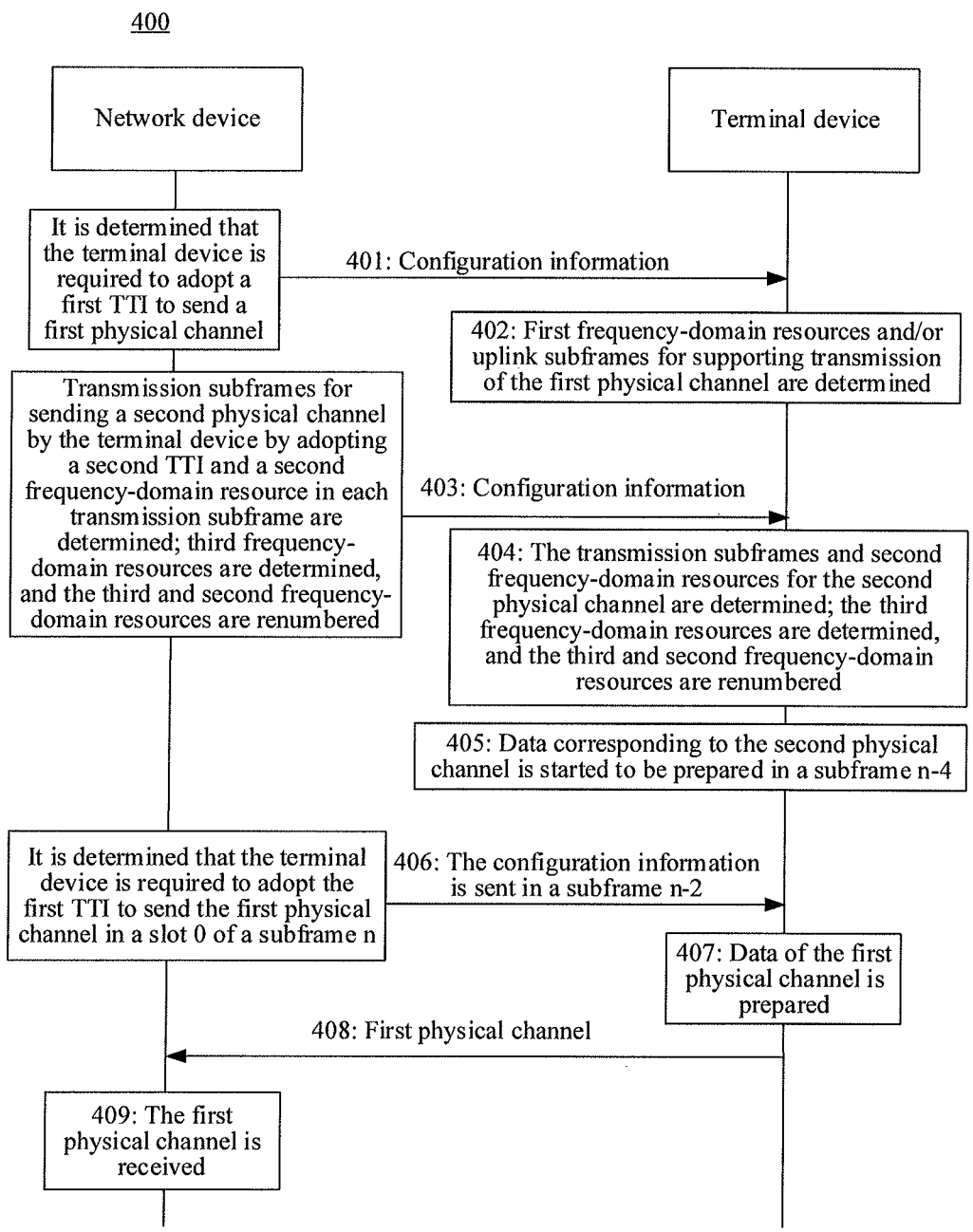
FIG. 10 is a schematic flowchart of a communication method according to an embodiment of the disclosure.

For clearer understanding, other detailed descriptions will be made to uplink transmission below in combination with a method 400 illustrated in FIG. 10.

In 401, a network device determines that a terminal device is required to adopt a first TTI to send a first physical channel, wherein the first physical channel is a dynamically scheduled PUSCH, and its TTI is 0.5 ms. The network device determines a first frequency-domain resource for sending the first physical channel by the terminal device in each uplink subframe and sends configuration information to the terminal to notify the first frequency-domain resources and/or the uplink subframes for supporting the terminal to send the first physical channel.

In 402, after receiving the configuration information sent by the network device, the terminal device determines the first frequency-domain resources and/or the uplink subframes for supporting transmission of the first physical channel to be sent.

In 403, the network device determines transmission subframes for sending a second physical channel by the terminal device by adopting a second TTI and a second frequency-domain resource in each transmission subframe, wherein the second physical channel is a semi-persistently scheduled PUSCH, and its TTI is 1 ms. The network device determines a third frequency-domain resource in each transmission subframe, and the third frequency-domain resources include at least part of the first frequency-domain resources and at least part of the second frequency-domain resources. The network device re-sequences all PRBs corresponding to the third frequency-domain resources and the second frequency-domain resources.

In 404, after receiving the configuration information sent by the network device, the terminal device determines the transmission subframes and second frequency-domain resources for the second physical channel. The terminal device determines the third frequency-domain resource in each transmission subframe, and the third frequency-domain resources include at least part of the first frequency-domain resources and at least part of the second frequency-domain resources. The terminal device re-sequences all the PRBs corresponding to the third frequency-domain resources and the second frequency-domain resources.

In 405, the terminal device determines in a subframe n−4 that the second physical channel is required to be sent to the terminal device by using the second TTI in a subframe n, and starts preparing data corresponding to the second physical channel.

In 406, the network device sends a DCI in a subframe n−2 to notify the terminal to send the first physical channel on a target frequency-domain resource in the subframe n by using the first TTI, wherein the target frequency-domain resource belongs to the third frequency-domain resource.

In 407, the terminal device receives the DCI in the subframe n−2, determines to send the first physical channel on the target frequency-domain resource in the subframe n by using the first TTI, starts preparing data corresponding to the first physical channel and stops preparing the data of the second physical channel.

In 408, the terminal device utilizes the target frequency-domain resource to send the first physical channel to the network device in the slot 0.

In 409, the network device receives the first physical channel sent through the target frequency-domain resource from the terminal device in the slot 0.

Optionally, during downlink transmission, the network device may send the DCI for indicating the target frequency-domain resource and the downlink data to the terminal device in the first target time unit, wherein the downlink data is sent through the target frequency-domain resource. The terminal device determines the target frequency-domain resource according to the DCI, and receives the downlink data sent by the network device on the target frequency-domain resource. Optionally, the network device may utilize the first frequency-domain resource to send the DCI to the terminal device in the first target time unit, so as to reduce a DCI blind detection number.

Optionally, during downlink transmission, the subframes corresponding to the target time units are downlink subframes or TDD-characterized subframes.

Optionally, the first physical channel is a dynamically scheduled PDSCH, and the second physical channel is a semi-persistently scheduled PDSCH.

Figure 11:
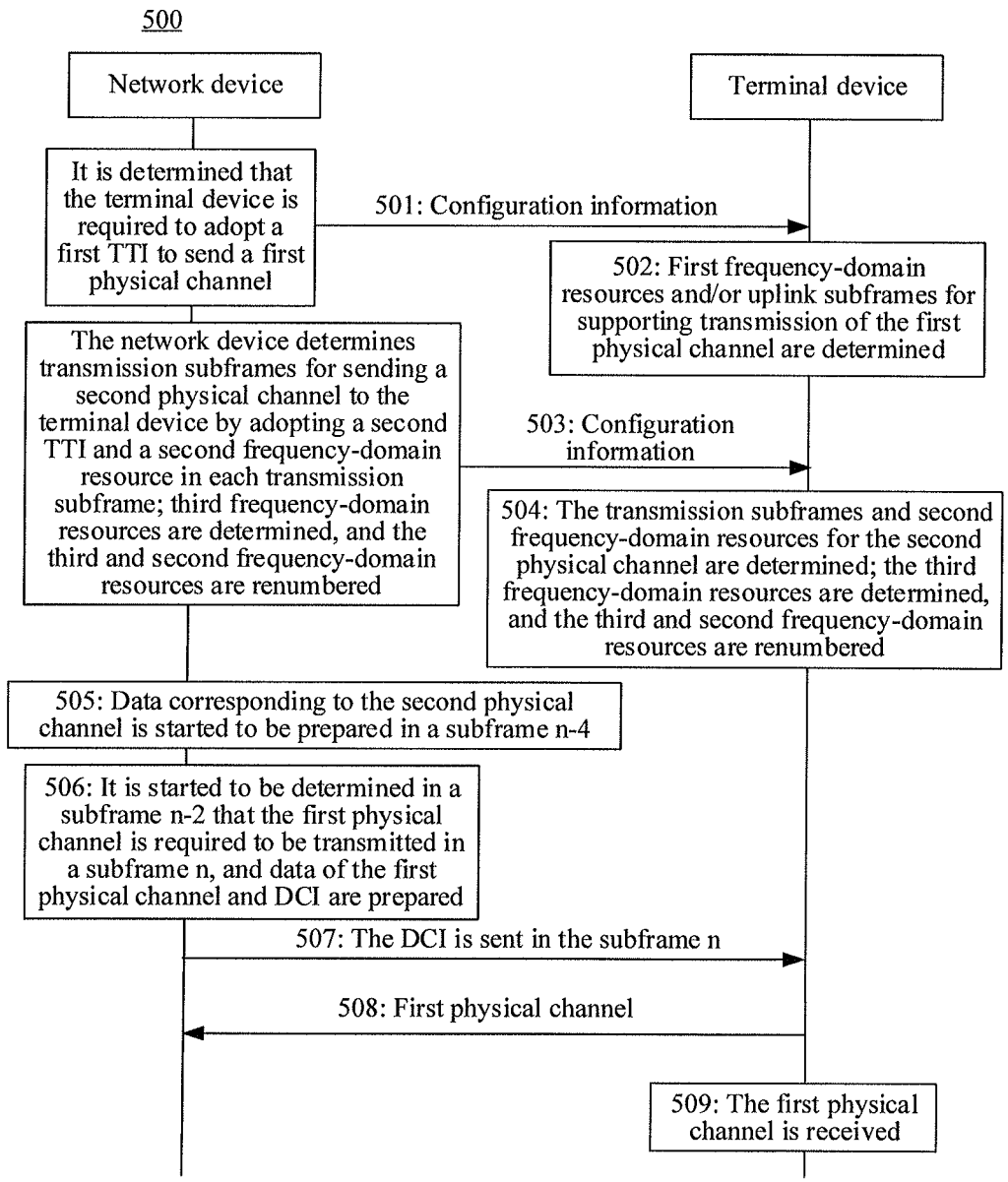
FIG. 11 is a schematic flowchart of a communication method according to an embodiment of the disclosure.

For clearer understanding, downlink transmission will be described below in combination with a method 500 illustrated in FIG. 11 in detail.

In 501, a network device determines that a terminal device is required to adopt a first TTI to send a first physical channel, wherein the first physical channel is a dynamically scheduled PDSCH, and its TTI is 0.5 ms. The network device determines a first frequency-domain resource for receiving the first physical channel by the terminal device in each subframe and sends configuration information to the terminal to notify the first frequency-domain resources and/or the subframes for supporting the terminal to receive the first physical channel.

In 502, after receiving the configuration information sent by the network device, the terminal device determines the first frequency-domain resources and/or the subframes for supporting reception of the first physical channel.

In 503, the network device determines transmission subframes for sending a second physical channel to the terminal device by adopting a second TTI and a second frequency-domain resource in each transmission subframe, wherein the second physical channel is a semi-persistently scheduled PDSCH, and its TTI is 1 ms. The network device determines a third frequency-domain resource in each transmission subframe, and the third frequency-domain resources include at least part of the first frequency-domain resources and at least part of the second frequency-domain resources. The network device re-sequences all PRBs corresponding to the third frequency-domain resources and the second frequency-domain resources.

In 504, after receiving the configuration information sent by the network device, the terminal device determines the transmission subframes and second frequency-domain resources for the second physical channel. The terminal device determines the third frequency-domain resource in each transmission subframe, and the third frequency-domain resources include at least part of the first frequency-domain resources and at least part of the second frequency-domain resources. The terminal device re-sequences all the PRBs corresponding to the third frequency-domain resources and the second frequency-domain resources.

In 505, the network device starts determining in a subframe n−4 that the second physical channel is required to be sent to the terminal device on the second frequency-domain resource by using the second TTI in a subframe n, and starts preparing data corresponding to the second physical channel.

In 506, the network device starts determining in a subframe n−2 that the first physical channel is required to be transmitted by using the first TTI in the subframe n, starts preparing data corresponding to the first physical channel and corresponding DCI, and stops preparing the data corresponding to the second physical channel.

In 507, the network device sends the DCI to the terminal device in a slot 0 of the subframe n, wherein the DCI is configured to indicate the terminal device to adopt the first TTI in the slot 0 of the subframe n and utilize a target frequency-domain resource to receive the first physical channel, and the target frequency-domain resource belongs to the third frequency-domain resource.

In 508, the network device adopts the target frequency-domain resource in the slot 0 of the subframe n to send the first physical channel to the terminal device.

In 509, the terminal device adopts the target frequency-domain resource in the slot 0 of the subframe n to receive the first physical channel sent by the network device.

It should be understood that, in various embodiments of the disclosure, sequence numbers of the above processes do not imply an execution sequence, and the execution sequence of each process should be determined by its function and an internal logic and should not form any limit to an implementation of the embodiments of the disclosure.

Figure 12:
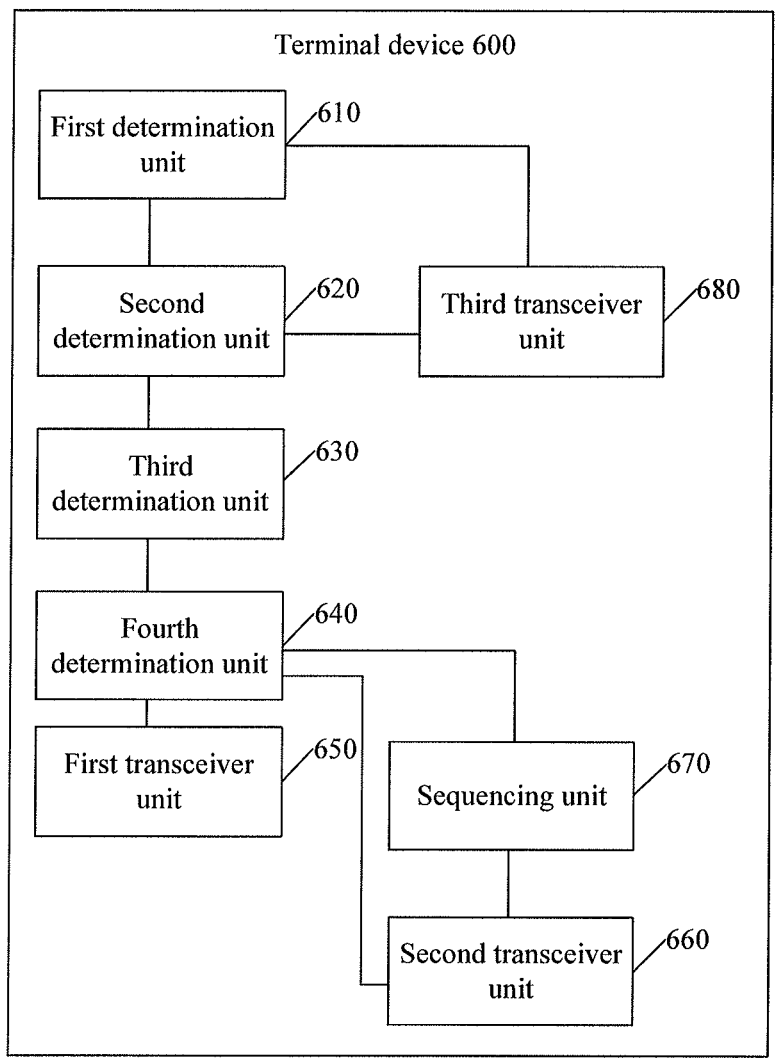
FIG. 12 is a schematic block diagram of a terminal device according to an embodiment of the disclosure.

FIG. 12 is a schematic block diagram of a terminal device 600 according to an embodiment of the disclosure. As illustrated in FIG. 12, the terminal device 600 includes a first determination unit 610, a second determination unit 620 and a third determination unit 630.

The first determination unit is configured to determine a first frequency-domain resource, wherein the first frequency-domain resource is an available resource preconfigured for supporting transmission of a first physical channel in a first target time unit by using a first TTI, and a time length of the first TTI is equal to a time length of the first target time unit. The second determination unit is configured to determine a second frequency-domain resource, wherein the second frequency-domain resource is determined to transmit a second physical channel in a second target time unit by using a second TTI, the second TTI is not smaller than the first TTI, and the second target time unit at least partially overlaps with the first target time unit. The third determination unit is configured to determine a third frequency-domain resource, wherein the third frequency-domain resource include at least part of frequency-domain resources of the second frequency-domain resource and the third frequency-domain resource is a maximum available frequency-domain resource for supporting transmission of the first physical channel in the first target time unit by using the first TTI.

Optionally, the third frequency-domain resource further includes at least part of frequency-domain resources of the first frequency-domain resource.

Optionally, as illustrated in FIG. 12, the terminal device 600 further includes a fourth determination unit 640 and a first transceiver unit 650. The fourth determination unit 640 is configured to determine a target frequency-domain resource from the third frequency-domain resource, and the first transceiver unit 650 is configured to utilize the target frequency-domain resource to send the first physical channel to a network device or receive the first physical channel sent by the network device in the first target time unit by using the first TTI.

Optionally, as illustrated in FIG. 12, the terminal device 600 further includes a second transceiver unit 660, configured to receive a first DCI sent by the network device, wherein the first DCI is configured to indicate a location of the target frequency-domain resource in the third frequency-domain resource. The fourth determination unit 640 is configured to determine the target frequency-domain resource on the basis of the DCI.

Optionally, as illustrated in FIG. 12, the terminal device further includes: a sequencing unit 670, configured to continuously re-sequence PRBs in the third frequency-domain resource, wherein the first DCI is configured to indicate a re-sequencing number of the PRB corresponding to the target frequency-domain resource to indicate the location of the target frequency-domain resource in the third frequency-domain resource.

Optionally, as illustrated in FIG. 12, the terminal device further includes: a second transceiver unit 660, configured to receive a DCI in a PDCCH or receive a DCI on the first frequency-domain resource in the first target time unit.

Optionally, as illustrated in FIG. 12, the terminal device 600 further includes a third transceiver unit 680, configured to receive at least one of the following information sent by the network device: first configuration information for indicating the first resource, second configuration information for indicating the second resource, third configuration information for indicating the terminal device to send or receive the first physical channel by using the first TTI, or fourth configuration information for indicating the terminal device to send or receive the second physical channel by using the second TTI.

Optionally, the first physical channel is a dynamically scheduled PDSCH, and the second physical channel is a semi-persistently scheduled PDSCH; or, the first physical channel is a dynamically scheduled PUSCH, and the second physical channel is a semi-persistently scheduled PUSCH; or, the first physical channel is a dynamically scheduled PUSCH, the second physical channel is a dynamically scheduled PUSCH, and the time length of the first target time unit is smaller than a time length of the second target time unit.

Optionally, when the first physical channel is a PUSCH, subframes to which the first target time unit and the second target time unit belong are uplink subframes; and/or, when the first physical channel is a PDSCH, the subframes to which the first target time unit and the second target time unit belong are downlink subframes or TDD-characterized subframes.

It should be understood that the terminal device 600 may realize corresponding functions of the terminal device in the method embodiment and will not be elaborated herein for simplicity.

Figure 13:
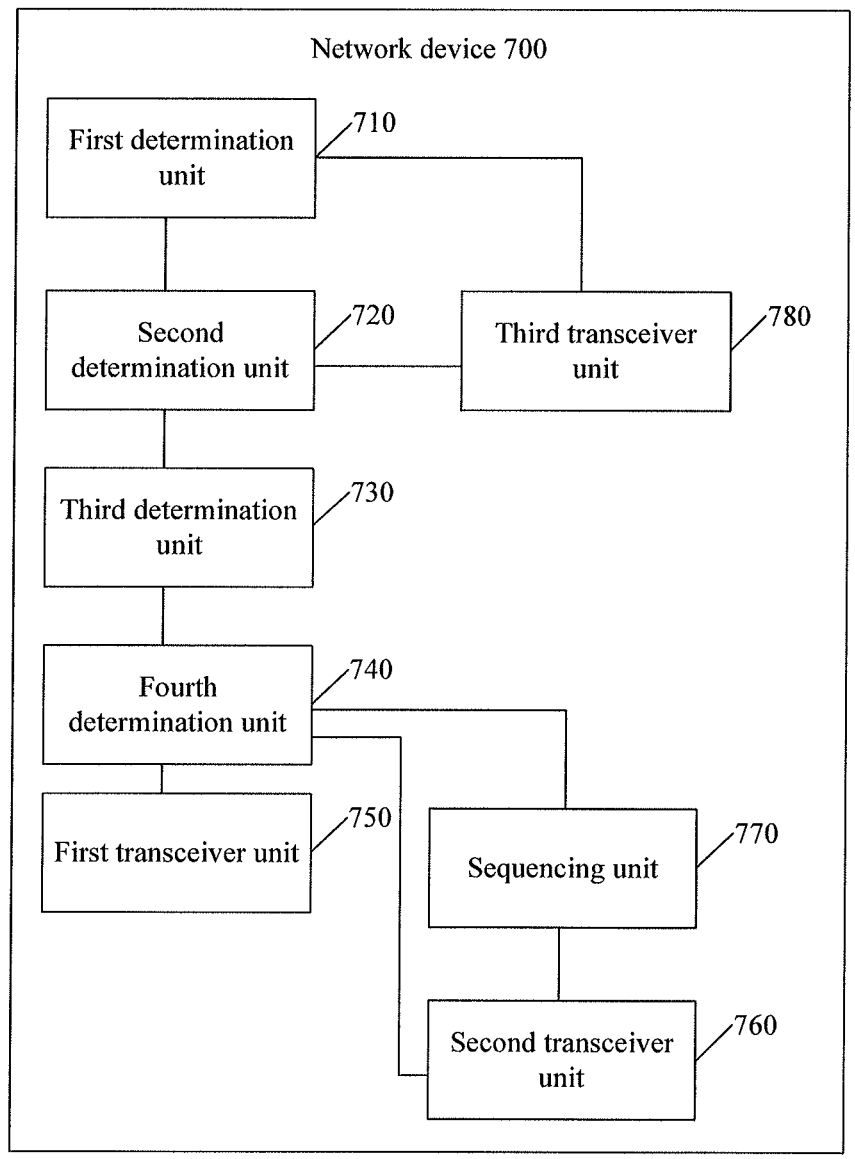
FIG. 13 is a schematic block diagram of a network device according to an embodiment of the disclosure.

FIG. 13 is a schematic block diagram of a network device 700 according to an embodiment of the disclosure. As illustrated in FIG. 13, the network device 700 includes a first determination unit 710, a second determination unit 720 and a third determination unit 730. The first determination unit 710 is configured to determine a first frequency-domain resource, wherein the first frequency-domain resource is an available resource which is preconfigured for supporting transmission of a first physical channel in a first target time unit by using a first TTI, and a time length of the first TN is equal to a time length of the first target time unit. The second determination unit 720 is configured to determine a second frequency-domain resource, wherein the second frequency-domain resource is determined to transmit a second physical channel in a second target time unit by using a second TTI, the second TTI is not smaller than the first TTI, and the second target time unit at least partially overlaps with the first target time unit. The third determination unit 730 is configured to determine a third frequency-domain resource, wherein the third frequency-domain resource includes at least part of frequency-domain resources of the second frequency-domain resource and the third frequency-domain resource is a maximum available frequency-domain resource for supporting transmission of the first physical channel in the first target time unit by using the first TTI.

Optionally, the third frequency-domain resource further includes at least part of frequency-domain resources of the first frequency-domain resource.

Optionally, as illustrated in FIG. 13, the network device 700 further includes: a fourth determination unit 740, configured to determine a target frequency-domain resource in the third frequency-domain resource; and a first transceiver unit 750, configured to utilize the target frequency-domain resource to send the first physical channel to a terminal device or receive the first physical channel sent by the terminal device in the first target time unit by using the first TTI.

Optionally, as illustrated in FIG. 13, the network device 700 further includes a second transceiver unit 760, configured to send a first DCI to the terminal device, wherein the first DCI is configured to indicate a location of the target frequency-domain resource in the third frequency-domain resource, such that the terminal device determines the target frequency-domain resource on the basis of the first DCI.

Optionally, as illustrated in FIG. 13, the network device 700 further includes a sequencing unit 770, configured to continuously re-sequence PRBs in the third frequency-domain resource, wherein the first DCI is configured to indicate a re-sequencing number of the PRB corresponding to the target frequency-domain resource to indicate the location of the target frequency-domain resource in the third frequency-domain resource.

Optionally, as illustrated in FIG. 13, the network device 700 further includes: a second transceiver unit 760, configured to send a DCI in a PDCCH, or send a DCI on the first frequency-domain resource in the first target time unit.

Optionally, as illustrated in FIG. 13, the network device 700 further includes a third transceiver unit 780, configured to send at least one of the following information to the terminal device:

first configuration information for indicating the first resource, second configuration information for indicating the second resource, third configuration information for indicating the terminal device to send or receive the first physical channel by using the first TTI, or fourth configuration information for indicating the terminal device to send or receive the second physical channel by using the second TTI.

Optionally, the first physical channel is a dynamically scheduled PDSCH, and the second physical channel is a semi-persistently scheduled PDSCH; or, the first physical channel is a dynamically scheduled PUSCH, and the second physical channel is a semi-persistently scheduled PUSCH; or, the first physical channel is a dynamically scheduled PUSCH, the second physical channel is a dynamically scheduled PUSCH, and the time length of the first target time unit is smaller than a time length of the second target time unit.

Optionally, when the first physical channel is a PUSCH, subframes to which the first target time unit and the second target time unit belong are uplink subframes; and/or, when the first physical channel is a PDSCH, the subframes to which the first target time unit and the second target time unit belong are downlink subframes or TDD-characterized subframes.

It should be understood that the network device 700 may realize corresponding functions of the network device in the method embodiment and will not be elaborated herein for simplicity.

Figure 14:
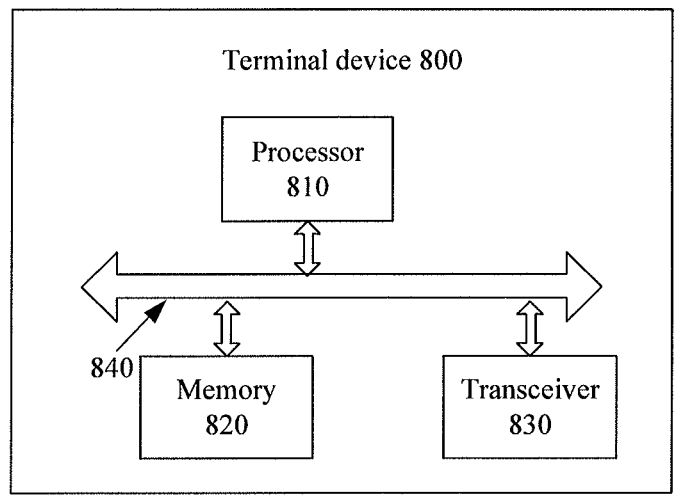
FIG. 14 is a schematic block diagram of a terminal device according to an embodiment of the disclosure.

FIG. 14 is a schematic block diagram of a terminal device 800 according to an embodiment of the disclosure. As illustrated in FIG. 14, the terminal device 800 includes a processor 810 and a memory 820. The memory 820 is configured to store a program instruction. The processor 810 may call the program instruction stored in the memory 820 to execute corresponding operations of the terminal device in the method embodiment. Optionally, the terminal device 800 further includes a transceiver 830 configured for external communication and a bus system 840 configured to interconnect the processor 810, the memory 820 and the transceiver 830.

Specifically, the processor 810 may call the program instruction stored in the memory 820 to execute the following processing: determining a first frequency-domain resource, wherein the first frequency-domain resource is an available resource preconfigured for supporting transmission of a first physical channel in a first target time unit by using a first TTI, and a time length of the first TTI is equal to a time length of the first target time unit; determining a second frequency-domain resource, wherein the second frequency-domain resource is determined to transmit a second physical channel in a second target time unit by using a second TTI, the second TTI is not smaller than the first TTI, and the second target time unit at least partially overlaps with the first target time unit; and determining a third frequency-domain resource, wherein the third frequency-domain resource includes at least part of frequency-domain resources of the second frequency-domain resource and the third frequency-domain resource is a maximum available frequency-domain resource for supporting transmission of the first physical channel in the first target time unit by using the first TTI.

Optionally, the third frequency-domain resource further includes at least part of frequency-domain resources of the first frequency-domain resource.

Specifically, the processor 810 may call the program instruction stored in the memory 820 to execute the following processing: determining, by the terminal device, a target frequency-domain resource in the third frequency-domain resource; and utilizing the target frequency-domain resource to send the first physical channel to a network device or receive the first physical channel sent by the network device in the first target time unit by adopting the first TTI.

Specifically, the processor 810 may call the program instruction stored in the memory 820 to execute the following processing: utilizing the transceiver 830 to receive a first DCI sent by the network device, wherein the first DCI is configured to indicate a location of the target frequency-domain resource in the third frequency-domain resource; and determining the target frequency-domain resource on the basis of the DCI.

Specifically, the processor 810 may call the program instruction stored in the memory 820 to execute the following processing: continuously re-sequencing PRBs in the third frequency-domain resource, wherein the first DCI is configured to indicate a re-sequencing number of the PRB corresponding to the target frequency-domain resource to indicate the location of the target frequency-domain resource in the third frequency-domain resource.

Specifically, the processor 810 may call the program instruction stored in the memory 820 to execute the following processing: utilizing the transceiver 830 to receive a DCI in a PDCCH or receive a DCI on the first frequency-domain resource in the first target time unit.

Specifically, the processor 810 may call the program instruction stored in the memory 820 to execute the following processing: utilizing the transceiver 830 to receive at least one of the following information sent by the network device: first configuration information for indicating the first resource, second configuration information for indicating the second resource, third configuration information for indicating the terminal device to send or receive the first physical channel by using the first TTI, or fourth configuration information for indicating the terminal device to send or receive the second physical channel by using the second TTI.

It should be understood that the terminal device 800 may realize corresponding functions of the terminal device in the method embodiment and will not be elaborated herein for simplicity.

Figure 15:
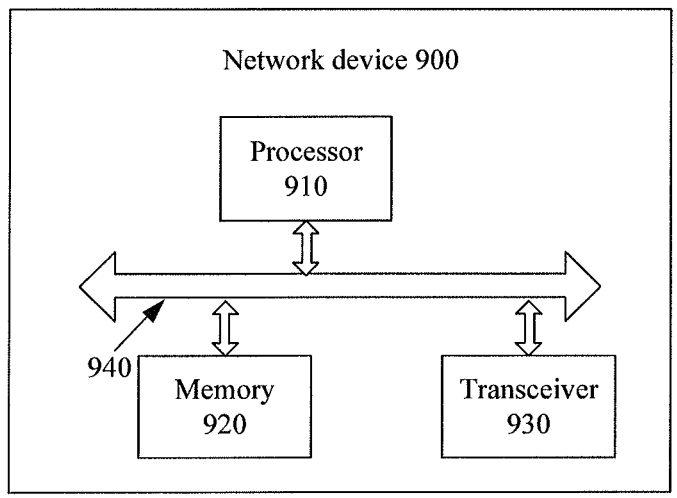
FIG. 15 is a schematic block diagram of a network device according to an embodiment of the disclosure.

FIG. 15 is a schematic block diagram of a network device 900 according to an embodiment of the disclosure. As illustrated in FIG. 15, the network device 900 includes a processor 910 and a memory 920. The memory 920 is configured to store a program instruction. The processor 910 may call the program instruction stored in the memory 920 to execute corresponding operations of the network device in the method embodiment. Optionally, the network device 900 further includes a transceiver 930 configured for external communication and a bus system 940 configured to interconnect the processor 910, the memory 920 and the transceiver 930.

Specifically, the processor 910 may call the program instruction stored in the memory 920 to execute the following processing: determining a first frequency-domain resource, wherein the first frequency-domain resource is an available resource preconfigured for supporting transmission of a first physical channel in a first target time unit by using a first TTI, and a time length of the first TTI is equal to a time length of the first target time unit; determining a second frequency-domain resource, wherein the second frequency-domain resource is determined to transmit a second physical channel in a second target time unit by using a second TTI, the second TTI is not smaller than the first TTI, and the second target time unit at least partially overlaps with the first target time unit; and determining a third frequency-domain resource, wherein the third frequency-domain resource includes at least part of frequency-domain resources of the second frequency-domain resource and the third frequency-domain resource is a maximum available frequency-domain resource for supporting transmission of the first physical channel in the first target time unit by using the first TTI.

Optionally, the third frequency-domain resource further includes at least part of frequency-domain resources of the first frequency-domain resource.

Specifically, the processor 910 may call the program instruction stored in the memory 910 to execute the following processing: determining a target frequency-domain resource from the third frequency-domain resource; and utilizing the target frequency-domain resource to send the first physical channel to a terminal device or receive the first physical channel sent by the terminal device through the transceiver 930 in the first target time unit by adopting the first TTI.

Specifically, the processor 910 may call the program instruction stored in the memory 920 to execute the following processing: sending first DCI to the terminal device through the transceiver 930, wherein the first DCI is configured to indicate a location of the target frequency-domain resource in the third frequency-domain resource, such that the terminal device determines the target frequency-domain resource on the basis of the first DCI.

Specifically, the processor 910 may call the program instruction stored in the memory 920 to execute the following processing: continuously re-sequencing PRBs in the third frequency-domain resource, wherein the first DCI is configured to indicate a re-sequencing number of the PRB corresponding to the target frequency-domain resource to indicate the location of the target frequency-domain resource in the third frequency-domain resource.

Specifically, the processor 910 may call the program instruction stored in the memory 920 to execute the following processing: sending a DCI in a PDCCH, or sending a DCI on the first frequency-domain resource in the first target time unit through the transceiver 930.

Specifically, the processor 910 may call the program instruction stored in the memory 920 to execute the following processing: sending at least one of the following information to the terminal device through the transceiver 930: first configuration information for indicating the first resource, second configuration information for indicating the second resource, third configuration information for indicating the terminal device to send or receive the first physical channel by using the first TTI, or fourth configuration information for indicating the terminal device to send or receive the second physical channel by using the second TTI.

It should be understood that the network device 900 may realize corresponding functions of the network device in the method embodiment and will not be elaborated herein for simplicity.

Those of ordinary skilled in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by virtue of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it should be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, function units in each embodiment of the disclosure may be integrated into a processing unit, each unit may also exist independently, and two or more than two units may also be integrated into a unit.

When being realized in form of software function unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a piece of computer equipment (which may be a personal computer, a server, network equipment or the like) to execute all or part of the steps of the method in each embodiment of the disclosure. The abovementioned storage medium includes: various media capable of storing program codes such as a U disk, a mobile hard disk, a Read-Only Memory (ROM), a Random Access Memory (RAM), a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A communication method, comprising:
   determining, by a terminal device, a first frequency-domain resource, wherein the first frequency-domain resource is an available resource preconfigured for supporting transmission of a first physical channel in a first target time unit by using a first Transmission Time Interval (TTI), and a time length of the first TTI is equal to a time length of the first target time unit;
   determining, by the terminal device, a second frequency-domain resource, wherein the second frequency-domain resource is determined to transmit a second physical channel in a second target time unit by using a second TTI, the second TTI is not smaller than the first TTI, and the second target time unit at least partially overlaps with the first target time unit; and determining, by the terminal device, a third frequency-domain resource, wherein the third frequency-domain resource comprises at least part of frequency-domain resources of the second frequency-domain resource, and the third frequency-domain resource is a maximum available frequency-domain resource for supporting transmission of the first physical channel in the first target time unit by using the first TTI;

determining, by the terminal device, a target frequency-domain resource from the third frequency-domain resource; and utilizing, by the terminal device, the target frequency-domain resource to send the first physical channel to a network device or receive the first physical channel sent by a network device in the first target time unit by using the first TTI;

wherein the determining, by the terminal device, the target frequency-domain resource from the third frequency-domain resource comprises:

receiving first Downlink Control Information (DCI) sent by the network device, wherein the first DCI is configured to indicate a location of the target frequency-domain resource in the third frequency-domain resource; and determining the target frequency-domain resource based on the DCI;

wherein the method further comprises:

continuously re-sequencing Physical Resource Blocks (PRBs) in the third frequency-domain resource, wherein the first DCI is configured to indicate a re-sequencing number of the PRB corresponding to the target frequency-domain resource to indicate the location of the target frequency-domain resource in the third frequency-domain resource.

2. The method according to claim 1, wherein the third frequency-domain resource further comprises at least part of frequency-domain resources of the first frequency-domain resource.

3. The method according to claim 1, further comprising:
receiving, by the terminal device, a DCI in a Physical Downlink Control Channel (PDCCH), or receiving a DCI on the first frequency-domain resource in the first target time unit.

4. The method according to claim 1, before determining, by the terminal device, the third frequency-domain resource, further comprising:
receiving at least one of the following information sent by the network device:
first configuration information for indicating the first resource, second configuration information for indicating the second resource, third configuration information for indicating the terminal device to send or receive the first physical channel by using the first TTI, or fourth configuration information for indicating the terminal device to send or receive the second physical channel by using the second TTI.

5. The method according to claim 1, wherein
the first physical channel is a dynamically scheduled Physical Downlink Shared Channel (PDSCH), and the second physical channel is a semi-persistently scheduled PDSCH; or, the first physical channel is a dynamically scheduled Physical Uplink Shared Channel (PUSCH), and the second physical channel is a semi-persistently scheduled PUSCH; or, the first physical channel is a dynamically scheduled PUSCH, the second physical channel is a dynamically scheduled PUSCH, and the time length of the first target time unit is smaller than a time length of the second target time unit.

6. The method according to claim 5, wherein
when the first physical channel is a PUSCH, subframes to which the first target time unit and the second target time unit belong are uplink subframes; or, when the first physical channel is a PDSCH, subframes to which the first target time unit and the second target time unit belong are downlink subframes or Time Division Duplex (TDD)-characterized subframes.

7. A communication method, comprising:
determining, by a network device, a first frequency-domain resource, wherein the first frequency-domain resource is an available resource preconfigured for supporting transmission of a first physical channel in a first target time unit by using a first Transmission Time Interval (TTI), and a time length of the first TTI is equal to a time length of the first target time unit;

determining, by the network device, a second frequency-domain resource, wherein the second frequency-domain resource is determined to transmit a second physical channel in a second target time unit by using a second TTI, the second TTI is not smaller than the first TTI, and the second target time unit at least partially overlaps with the first target time unit; and determining, by the network device, a third frequency-domain resource, wherein the third frequency-domain resource comprises at least part of frequency-domain resources of the second frequency-domain resource, and the third frequency-domain resource is a maximum available frequency-domain resource for supporting transmission of the first physical channel in the first target time unit by using the first TTI;

determining, by the network device, a target frequency-domain resource from the third frequency-domain resource; and utilizing, by the network device, the target frequency-domain resource to send the first physical channel to a terminal device or receive the first physical channel sent by a terminal device in the first target time unit by using the first TTI;

sending, by the network device, first Downlink Control Information (DCI) to the terminal device which determines the target frequency-domain resource based on the first DCI, wherein the first DCI is configured to indicate a location of the target frequency-domain resource in the third frequency-domain resource;

continuously re-sequencing Physical Resource Blocks (PRBs) in the third frequency-domain resource, wherein the first DCI is configured to indicate a re-sequencing number of the PRB corresponding to the target frequency-domain resource to indicate the location of the target frequency-domain resource in the third frequency-domain resource.

8. The method according to claim 7, wherein the third frequency-domain resource further comprises at least part of frequency-domain resources of the first frequency-domain resource.

9. The method according to claim 7, further comprising:
sending, by the network device, a DCI in a Physical Downlink Control Channel (PDCCH), or sending a DCI on the first frequency-domain resource in the first target time unit.

10. The method according to claim 7, further comprising:
sending at least one of the following information to the terminal device:
first configuration information for indicating the first resource, second configuration information for indicating the second resource, third configuration information for indicating the terminal device to send or receive the first physical channel by using the first TTI, or fourth configuration information for indicating the terminal device to send or receive the second physical channel by using the second TTI.

11. The method according to claim 7, wherein
the first physical channel is a dynamically scheduled Physical Downlink Shared Channel (PDSCH), and the second physical channel is a semi-persistently scheduled PDSCH; or,
the first physical channel is a dynamically scheduled Physical Uplink Shared Channel (PUSCH), and the second physical channel is a semi-persistently scheduled PUSCH; or,
the first physical channel is a dynamically scheduled PUSCH, the second physical channel is a dynamically scheduled PUSCH, and the time length of the first target time unit is smaller than a time length of the second target time unit.

12. The method according to claim 11, wherein
when the first physical channel is a PUSCH, subframes to which the first target time unit and the second target time unit belong are uplink subframes; or,
when the first physical channel is a PDSCH, subframes to which the first target time unit and the second target time unit belong are downlink subframes or Time Division Duplex (TDD)-characterized subframes.

13. A terminal device, comprising: a memory, a processor, and a computer program stored on the memory and capable of running on the processor, wherein the computer program, when executed by the processor, causes the processor to execute operations comprising:
determining a first frequency-domain resource, wherein the first frequency-domain resource is an available resource preconfigured for supporting transmission of a first physical channel in a first target time unit by using a first Transmission Time Interval (TTI), and a time length of the first TTI is equal to a time length of the first target time unit;
determining a second frequency-domain resource, wherein the second frequency-domain resource is determined to transmit a second physical channel in a second target time unit by using a second TTI, the second TTI is not smaller than the first TTI, and the second target time unit at least partially overlaps with the first target time unit; and
determining a third frequency-domain resource, wherein the third frequency-domain resource comprises at least part of frequency-domain resources of the second frequency-domain resource and the third frequency-domain resource is a maximum available frequency-domain resource for supporting transmission of the first physical channel in the first target time unit by using the first TTI;
determining, by the terminal device, a target frequency-domain resource from the third frequency-domain resource; and
utilizing, by the terminal device, the target frequency-domain resource to send the first physical channel to a network device or receive the first physical channel sent by a network device in the first target time unit by using the first TTI;
wherein the determining, by the terminal device, the target frequency-domain resource from the third frequency-domain resource comprises:
receiving first Downlink Control Information (DCI) sent by the network device, wherein the first DCI is configured to indicate a location of the target frequency-domain resource in the third frequency-domain resource; and
determining the target frequency-domain resource based on the DCI;
wherein the operations further comprises:
continuously re-sequencing Physical Resource Blocks (PRBs) in the third frequency-domain resource,
wherein the first DCI is configured to indicate a re-sequencing number of the PRB corresponding to the target frequency-domain resource to indicate the location of the target frequency-domain resource in the third frequency-domain resource.

14. The terminal device according to claim 13, wherein the third frequency-domain resource further comprises at least part of frequency-domain resources of the first frequency-domain resource.

* * * * *